Patented Sept. 1, 1942

2,294,877

UNITED STATES PATENT OFFICE 2,294,877

TREATMENT OF DRILLING FLUIDS

Truman B. Wayne, Houston, Tex.

No Drawing. Application September 5, 1941,
Serial No. 409,655

17 Claims. (Cl. 252—8.5)

This invention relates to the treatment of drilling fluids, and particularly to the treatment of such fluids as are employed in the rotary drilling of oil and gas wells. As to common subject-matter, this application is a continuation of my application Serial No. 24,083, filed May 29, 1935, and other applications hereinafter referred to.

A drilling fluid, particularly that employed for rotary drilling operations and which is also called "drilling mud" and "mud-laden fluid," may be made from the natural clay which occurs at the location of the well, or may be synthetically compounded from the clay and mud bases of commerce, including bentonite and beidellite. Such a drilling fluid, therefore, contains a gel-forming constituent which is generally bentonitic in its nature; it may, however, contain a weighting material such as barytes, iron oxide, or the like, for increasing the specific gravity of the fluid.

The function and purposes of such a drilling fluid, when employed in rotary drilling operations, are to assist in the drilling, carry the cuttings to the surface, lubricate the bit and, finally, to wall off the bore hole. In order to perform the above functions and purposes, the composition and condition of the drilling fluid must be rather closely controlled, and that is particularly true of its viscosity; for if the viscosity is too low, the cuttings will not be carried to the surface properly, and freezing of the drill stem may take place; if the viscosity is too high, then the cuttings will not be properly deposited in the settling ditch or slush pit of the well, and, moreover, the drilling fluid column is likely to become "gas-cut," that is, become permeated with gas from the formation being drilled. Furthermore, the specific gravity of the drilling column is limited, particularly where clay containing a gel-forming constituent is used, and, practically, this specific gravity cannot be increased beyond 1.2. It is therefore necessary to employ weighting materials to increase the specific gravity. For practical purposes the viscosity must be maintained at between 15 and 45 centipoises as measured on a Stormer viscosimeter.

The environment under which a drilling fluid is used is exceedingly special. The drilling of the formation causes cuttings to enter the fluid and these cuttings may include salts or materials which increase the viscosity, the salts particularly affecting such viscosity being those of calcium and magnesium. After the cementing of a formation the subsequent drilling through the cement will rapidly increase the viscosity of the drilling fluid, the condition being known as "cement-cut mud." Furthermore, as the depth of the well increases, the temperature of the formation being drilled increases, and such temperature may be above the boiling point of water.

One of the objects of this invention, therefore, is to provide a drilling fluid and a treatment of a drilling fluid for effectively controlling the viscosity and thixotropic properties thereof.

A more specific object is to provide a process of treating drilling fluids in order to overcome the effects of the entrance of the formation's constituents into the fluid, and even to overcome the effects of the water employed in making such a drilling fluid.

A more specific object of this invention also is to provide a process for the treatment of a drilling fluid by a class of chemical agents for the purposes heretofore stated.

Another object is to provide a drilling fluid which has improved properties and characteristics, adapting it particularly for the purposes for which it is designed.

Further objects will appear from the detailed description in which will be set forth a number of embodiments of this invention; it is to be understood, however, that this invention is susceptible of various embodiments within the scope of the appended claims.

Generally stated and in accordance with this invention, a mud-laden drilling fluid has incorporated therewith a small percentage of a water-soluble polyphosphoric acid compound, either alone or in connection with a suitable buffer, or with a lyophile colloid, or with both; and the treating agent may be maintained in a slightly alkalinized condition.

Polyphosphoric acid compounds of the character described include all of the water-soluble phosphoric acid compounds of the meta group and all of the water-soluble phosphoric acid compounds of the pyro group. The first salt of the meta group is sodium monometaphosphate, $NaPO_3$; however, this salt is really not water-soluble and, furthermore, cannot be classed as a polyphosphoric acid compound. Polymeric salts of metaphosphoric acid, from dimetaphosphoric acid to hexametaphosphoric acid and including tetrametaphosphoric acid, are available. Of these the ammonium and alkali metal salts are water-soluble. Higher derivatives such as octametaphosphates and decametaphosphates have also been described, but their existence is doubtful. The members of the pyro group, beginning with what is commonly called "pyrophosphoric acid," $H_4P_2O_7$, and including also triphosphoric acid, $H_5P_3O_{10}$, and tetraphosphoric acid, $H_6P_4O_{13}$, are all water-soluble and are all polyphosphoric acids. As distinguished from the polymetaphosphoric acids, the polyphosphoric acids of the pyro group are, however, polybasic; therefore, for convenience, the entire pyro group may be designated as "polybasic-polyphosphoric acids."

Water-soluble salts of orthophosphoric acid compounds may be employed for the treatment of drilling fluids in order to reduce their viscosity. However, such compounds are very inefficient as compared to the efficiency of polyphosphoric acid compounds in such treatment. On the other hand, all of the polyphosphoric acid compounds exhibit this high efficiency, and, generally, the various members of the class of polyphosphates, including those of the meta and pyro groups, have the same efficiency, differing generally only in degree. However, the efficiency of water-soluble polyphosphoric acid compounds in the treatment of drilling fluids differ in kind from the efficiency of water-soluble orthophosphoric acid compounds.

The term "water-soluble polyphosphoric acid compound" can further be considered as meaning any water-soluble compound of the group comprising the oxy-acids of phosphorus and their salts, esters, amino-derivatives, and any other soluble derivative of these oxy-acids which is derived from the replacement of O, H, and OH ions attached to a P atom of an oxy-acid of phosphorus and in which the number of P atoms within the molecule is at least two.

Generically, the various phosphoric acid compounds may be considered as derivatives of phosphorus pentoxide, $P_2O_5$, and the derivation of the acids through the addition of the elements of water to phosphorus pentoxide may be illustrated according to the following equations:

$P_2O_5 + H_2O = 2HPO_3$, metaphosphoric acid (1)
$P_2O_5 + 2H_2O = H_4P_2O_7$, pyrophosphoric acid (2)
$P_2O_5 + 3H_2O = 2H_3PO_4$, orthophosphoric acid (3)

Following this same principle, and disregarding the possible formation of mixtures of metaphosphoric and pyrophosphoric acids, the so-called tetraphosphoric acid may be derived as follows:

$2P_2O_5 + 3H_2O = H_6P_4O_{13}$, tetraphosphoric acid (4)

In similar manner, triphosphoric acid is theoretically obtained:

$3P_2O_5 + 5H_2O = 2H_5P_3O_{10}$, triphosphoric acid (5)

While it is theoretically possible to derive the water-soluble salts of polyphosphoric acids through the procedures described above, such compounds are prepared practically by the fusion of phosphoric acid salts, or by fusing mixtures of orthophosphoric acid salts and alkalies, or by fusing mixtures of salts of monophosphoric acids and polyphosphoric acids. Theoretically, a large number of polyphosphoric acid compounds are possible from such fusions, each differing only minutely from the adjacent member of the series. While there is confusion in technical literature as to the existence of some of the higher polyphosphates, that is immaterial to the practical application of the principles of the present invention, since all polyphosphates operate in substantially the same manner when employed in the treatment of drilling fluids and produce comparable results, differing only in degree as distinguished from the action of orthophosphoric acid compounds on drilling fluids, from which they all differ in kind.

The polyphosphoric acid compounds may conveniently be grouped into two sub-classes, (a) the soluble polymeric metaphosphates, or polymetaphosphates, which may be considered as derived from monobasic metaphosphoric acid, represented by the type formula $$(MPO_3)_x$$

where M represents sodium, potassium, lithium, or ammonium, and $x$ is at least 2; and (b) the polyphosphates, which may be considered as derivatives of the polybasic polyphosphoric acids, of which what is commonly called pyrophosphoric acid is the first member, and represented by the type formula $$M_{x+2}P_xO_{3x+1}$$

where M represents ammonium or an alkali metal, or where it may be composed of any of these singly together with hydrogen. In the polybasic polyphosphoric acid compounds which are of high molecular weight or which may comprise a mixture of polyphosphates, the presence of one or more equivalents of a poly-valent metallic ion such as Ca, Mg, Al, Zn, or the like, may be included without markedly affecting the properties of the compound as a degeling agent, provided the compound is still soluble in the drilling fluid to the necessary degree.

In my co-pending application Serial No. 24,083, filed May 29, 1935, there are disclosed, for the treatment of drilling fluids, water-soluble salts of metaphosphoric acid and pyrophosphoric acid, with or without suitable peptizing agents such as the tannins, or with or without suitable buffers such as sodium gallate. The water-soluble salts of meta- and pyrophosphoric acids which were then in commercial use for various purposes, were sodium hexametaphosphate, $(NaPO_3)_6$, what was commonly called "sodium pyrophosphate," $Na_4P_2O_7$ and disodium dihydrogen pyrophosphates $Na_2H_2P_2O_7$; although various other water-soluble polyphosphates of the meta- and pyro- groups, including the ammonium and sodium and other alkali metal salts, were known in the technical literature. The monometaphosphate, for instance sodium monometaphosphate $NaPO_3$, however, was known as not being a water-soluble metaphosphate, and it is not a polyphosphoric acid compound since it has only one P atom in its structure, only the polymeric forms of sodium metaphosphate being soluble in water. At that time, moreover, sodium hexametaphosphate was generally designated commercially as "sodium metaphosphate."

My co-pending application Serial No. 71,179, filed March 26, 1936, disclosed for the treatment of drilling fluids generally a treating agent containing a radical which will react with Ca, Mg, Fe, and Al salts so as to produce colloidal reaction products; particularly such an agent containing a phosphate radical in such a condition as to secure this result, and still more particularly an agent containing the metaphosphate radical, an example of which was sodium hexamethaphosphate, with or without a suitable lyophile colloid such as a tannin, and with or without a suitable buffer such as the sodium silicates, sodium tannates, sodium orthophosphates, etc. It also disclosed the employment, in the treatment of drilling fluids, of esters of the polyphosphates, particularly the esters of metaphosphoric acids.

My co-pending application Serial No. 163,612, filed September 13, 1937, disclosed for the treatment of drilling fluids, various water-soluble polyphosphoric acid compounds of the polymeta and of the polybasic polyphosphate groups: those of the polymeta group being sodium tetrametaphosphate, $(NaPO_3)_4$, and sodium hexametaphosphate $(NaPO_3)_6$; and those of the polybasic polyphosphate group being pyrophosphoric acid, $H_4P_2O_7$, disodium dihydrogen pyrophosphate, $Na_2H_2P_2O_7$, tetrasodium pyrophosphate, $Na_4P_2O_7$, tetraphosphoric acid, $H_6P_4O_{13}$, sodium tetraphosphate, $Na_6P_4O_{13}$, and a complex phosphate, $Na_8P_6O_{19}$, which latter can be prepared by fusing two molecules of monosodium dihydrogen phosphate and one molecule of disodium monohydrogen phosphate to a glass in the usual manner used in the preparation of hexametaphosphates. The above application also refers to complex phosphates having other elements, such as, sulphur, chlorine and nitrogen in their molecules, examples of sulphur being the thiotetraphosphates. The polybasic-polyphosphoric acid compounds have characteristics which distinguish them from the polymeta compounds in that their pH values are not the same, the former giving a neutral or even an alkaline reaction while the latter are acidic; the former are also capable of forming their own buffers. All of these were disclosed for employment separately or in connection with a lyophile colloid, or in connection with a buffer salt, or in connection with both of the latter. Suitable lyophile colloids are tannins such as chestnut extract, polyphenolic bodies, humates, lignins and certain sulphonic acids. Suitable buffers are sodium silicate, sodium borate and the orthophosphates, such as disodium orthophosphate.

My co-pending application Serial No. 199,646, filed April 2, 1938, disclosed, for the treatment of drilling fluids, thiophosphoric acid compounds, and more particularly phosphoric acid compounds in which one or more of the oxygen atoms attached to the phosphorus atom is replaced by sulphur, particular examples being sodium monothiotetraphosphate, $Na_6P_4O_{12}S$, and sodium trithiotetraphosphate, $Na_6P_4O_{10}S_3$. These thiophosphates still retain generally the polyphosphate structure, and that is particularly true of the two examples disclosed, both of which retain sufficient of the phosphorus oxy-acid structure to be classed as sodium salts of tetraphosphoric acid and to be classed as polyphosphoric acid compounds. Such compounds are efficient drilling fluid treating-agents, having generally the same efficiency as have the other water-soluble polyphosphoric acid compounds.

My application Serial No. 164,528, filed September 18, 1937, as a continuation of my application Serial No. 71,179, filed March 27, 1936, as to common subject-matter discloses, for the treatment of drilling fluids, the employment of esters of phosphoric acids. Among the reagents disclosed are esters prepared from a hydrophile hydroxy organic body and polyphosphoric acids or their anhydride, $P_2O_5$. Such esters also belong to the generic class of polyphosphoric acid compounds when prepared under conditions which preserve the

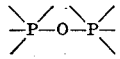

linkage. Such polyphosphoric acid esters are readily prepared from phosphorus pentoxide, and also from the polyphosphoric acids themselves, by providing for the removal of water formed during esterification which, if allowed to remain, would hydrate the polyphosphoric acid yet remaining in the reaction mixture. Members of this class are polyphosphoric acid esters which contain at least one but preferably two or more acid valances which may remain free, or which may be neutralized with an alkali metal or ammonium hydroxide or carbonate. The efficiency of these polyphosphoric compounds are on the order of the efficiency of the other inorganic polyphosphoric acid compounds when employed in the treatment of drilling fluids.

My copending application Serial No. 265,146, filed March 31, 1939, discloses for the treatment of drilling fluids, compounds which are generally designated as "amino-phosphate bodies." Some of the compounds disclosed are polyphosphoric acid compounds in that their structure is based on the presence of the

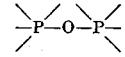

radical. They differ from the alkali metal polyphosphates in that direct linkages are present between nitrogen and phosphorus groups, and/or esterification has taken place between an alkylolamine radical and at least one acidic group of the polyphosphoric acid radical. These principles are illustrated by the type formulas of the specification and by all of the specific examples. Here, again, the efficiency of these polyphosphoric acid compounds in the drilling fluids is comparable with the efficiency of the inorganic polyphosphate compounds.

My co-pending application Serial No. 292,887, filed August 31, 1939, discloses complex organic-inorganic fusion products derived from acidic oxide derivatives and organic hydroxy bodies. Various polyphosphoric acid esters of the type characterized by the presence of at least two polyphosphoric acid radicals, and further characterized by a fused and polymerized structure, are disclosed and illustrated in the specific examples. Here, again, the efficiency of these polyphosphoric acid compounds in drilling fluids is comparable with the efficiency of the inorganic polyphosphate compounds.

My co-pending application Serial No. 277,565, filed June 5, 1939, discloses certain nitrogeneous hydrophilic esters of polyphosphoric acids which are characterized by the presence of at least one amino residue and an esterified radical derived from an organic hydroxy body. These esters are likewise characterized by the presence of the polyphosphoric acid radical,

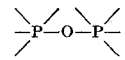

but differ from the polyphosphoric acid esters previously disclosed in the nature of the organic radicals. Here, again, the efficiency of these polyphosphoric acid compounds in drilling fluids is comparable with the efficiency of the inorganic polyphosphate compounds.

From the above it will be seen that the various polyphosphoric acid compounds are all characterized by the presence of the polyphosphoric acid radical

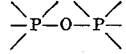

which is linked to a variety of other ions or radicals. This same structural formula applies to both sub-classes of polyphosphoric acid compounds

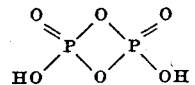

Dimetaphosphoric acid

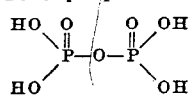

Diphosphoric acid

Higher members of the metaphosphoric acid group are believed to be formed by addition or polymerization through co-valent oxygen atoms, whereas higher members of the polybasic polyphosphoric group are formed through the elimination of a molecule of water from adjacent OH groups. Both sub-classes, however, are characterized by a co-valent linkage with an oxygen atom which joins the P atoms. In the organic compounds the elements of at least one OH group of the polyphosphoric acid radical are replaced or substituted by organic radicals.

The following table will show the comparative efficiencies of water-soluble polyphosphoric acid compounds, as distinguished from the orthophosphates, in the treatment of drilling fluids. It is the result of a test on a drilling fluid compounded from Wyoming bentonite and water and containing 8% of Wyoming bentonite. In this table the viscosity is in centipoises, secured with a Stormer viscosimeter at 600 R. P. M. at approximately 25° C.

| Phosphate tested | Viscosity in centipoises at various ratios (grams of phosphate per 100 ml. of fluid) | | | | |
|---|---|---|---|---|---|
|  | 0.02 | 0.04 | 0.10 | 0.20 | 0.40 |
| Original fluid (untreated) | 48 | 48 | 48 | 48 | 48 |
| $NaH_2PO_4$, anhydrous | 44 | 38 | 33 | 29 | 25 |
| $Na_2HPO_4$, anhydrous | 44 | 39 | 33 | 28 | 25 |
| $Na_2H_2P_2O_7$, anhydrous | 35 | 29 | 23 | 17 | 15 |
| $Na_4P_2O_7$, anhydrous | 35 | 29 | 23 | 19 | 15 |
| $Na_5P_4O_{13}$, tetra, anhyd | 35 | 31 | 28 | 25 | 19 |
| $Na_8P_6O_{19}$, hexa, anhyd | 33 | 29 | 28 | 23 | 17 |
| $Na_{27}P_{25}O_{76}$, high-poly, anhyd | 35 | 29 | 28 | 21 | 17 |
| $(NaPO_3)_6$, hexameta, anhyd | 33 | 28 | 23 | 21 | 17 |
| $P_2O_5$—$NH_3$ complex[1] | 33 | 29 | 28 | 23 | 18 |
| Polyphosphoric acid ester[2] | 31 | 27 | 25 | 21 | 16 |

[1] Polymerized ammonium imido diphosphoric acid (U. S. No. 1,222,122).
[2] Tetraphosphoric acid—tannin ester.

The above test shows that the polyphosphates have an efficiency in the treatment of drilling fluids which is many times that of the orthophosphates, so that the difference in actions between the polyphosphates and the orthophosphates on a drilling fluid is not simply one of degree but one of kind. Moreover, the table shows that all of the polyphosphoric acid compounds have comparable efficiencies and that in such respect they differ more or less in degree, although the various members of the polyphosphoric acid compound class have individual advantages and features of utility.

The above test is, of course, a laboratory test, made in order to show the comparative efficiencies of the various agents enumerated in the treatment of drilling fluids. In the actual treatment of drilling fluid, the procedure is not one of using a given proportion or percentage of the treating agent with reference to the drilling fluid; the treatment is one of adjusting the viscosity of the drilling fluid by the addition of the treating agent. This will be apparent when we consider the fact that during the course of drilling a formation which may contain salts, cement, or cuttings, generally the viscosity will be affected by the addition of these formation ingredients. The water used in the making of the drilling fluid, the temperature at the bottom of the well (which, as previously stated, may be above the boiling point of water), and other conditions also affect the viscosity of the drilling fluid. The practical procedure, therefore, is to add the treating agent in accordance with the requirements in order to secure the desired viscosity and, in general, the desired reduction of the viscosity of a drilling fluid which has become contaminated by the ingredients of the formation.

The applications referred to give examples of treating compositions, of which a few will be given for illustrative purposes.

Of the polymetaphosphoric compounds, sodium hexametaphosphate may be used as a 10% solution in water; or 10 lbs. of a dry mixture prepared from 9 parts of powdered sodium hexametaphosphate and 1 part of soda ash may be dissolved in 50 gals. of water.

Of the polyphosphoric acid compounds of the pyro group, the following are illustrative examples: a 10% water solution of tetrasodium pyrophosphate; a 10% water solution of sodium tetraphosphate; an agent comprising 100 parts of tetrasodium pyrophosphate, 100 parts of chestnut extract, and 35 parts of caustic soda in 1000 parts of water; a water solution containing 100 grams of sodium tetraphosphate, 100 grams of chestnut extract, and 50 grams of sodium hydroxide in 1000 cc. of water.

Of the thiophosphates, a 10% water solution of sodium monothiotetraphosphate; a 10% water solution of sodium trithiotetraphosphate; a water solution containing 10% of sodium monothiotetraphosphate and 10% by weight of chestnut extract; a water solution containing 10% of sodium trithiotetraphosphate and 10% by weight of chestnut extract.

Of the esters of polyphosphoric compounds, a 10% alcoholic solution of an ester prepared from 3 molecules of anhydrous metaphosphoric acid and 1 molecule of the anhydrous sodium salt of gallic acid. As examples of polyphosphoric acid compounds designated as "amino-phosphate bodies," a 10% water solution of the reaction product of 1 mol of technical tetraphosphoric acid with 1 mol of technical monoamylamine at 200° C. for two hours; or a 10% aqueous solution of a polymerized imido diphosphoric acid such as that described in Woodstock U. S. Patent No. 1,222,122 and also in application Serial No. 265,146.

While a number of embodiments have been described above, it will be understood that this invention is susceptible of various other embodiments within the scope of the appended claims. Furthermore, while theories of action have been put forth, this has been done only to facilitate the disclosure, without limitation of the invention to any theory.

The invention having thus been described, what is claimed is:

1. A mud-laden drilling fluid containing a small percentage of a water-soluble polyphosphoric acid compound.

2. In the art of drilling wells by the employment of a drilling fluid, the process comprising, adding to the drilling fluid a small percentage of a water-soluble polyphosphoric acid compound.

3. A mud-laden drilling fluid containing a small percentage of a water-soluble salt of a class of polyphosphoric acid compounds consisting of the metaphosphoric acid and the pyrophosphoric acid groups.

4. In the art of drilling wells by the employment of a drilling fluid, the process comprising, adding to the drilling fluid a small percentage of a water-soluble salt of a class of phosphoric acid compounds consisting of the metaphosphoric acid and the pyrophosphoric acid groups.

5. A mud-laden drilling fluid containing a small percentage of a water-soluble polyphosphoric acid compound and of a lyophile colloid.

6. In the art of drilling wells by the employment of a drilling fluid, the process comprising, adding to the drilling fluid a small percentage of a water-soluble polyphosphoric acid compound and of a lyophile colloid.

7. A mud-laden drilling fluid containing a small percentage of a water-soluble salt of a class of phosphoric acid compounds consisting of the metaphosphoric acid and the pyrophosphoric acid groups and of a lyophile colloid.

8. In the art of drilling wells by the employment of a drilling fluid, the process comprising, adding to the drilling fluid a small percentage of a water-soluble salt of a class of phosphoric acid compounds consisting of the metaphosphoric acid and the pyrophosphoric acid groups and of a lyophile colloid.

9. A mud-laden drilling fluid containing a small percentage of a water-soluble polyphosphoric acid compound and of a buffer.

10. In the art of drilling wells by the employment of a drilling fluid, the process comprising, adding to the drilling fluid a small percentage of a water-soluble polyphosphoric acid compound and of a buffer.

11. A mud-laden drilling fluid containing a small percentage of a water-soluble polyphosphoric acid compound, of a buffer and of a lyophile colloid.

12. In the art of drilling wells by the employment of a drilling fluid, the process comprising, adding to the drilling fluid a small percentage of a water-soluble polyphosphoric acid compound, of a buffer and of a lyophile colloid.

13. A mud-laden drilling-fluid containing a small percentage of a water-soluble polybasic-polyphosphoric acid compound.

14. In the art of drilling wells by the employment of a drilling-fluid, the process comprising, adding to the drilling-fluid a small percentage of a water-soluble polybasic-polyphosphoric acid compound.

15. A mud-laden drilling-fluid containing a small percentage of an alkali metal pyrophosphate.

16. In the art of drilling wells by the employment of a drilling-fluid, the process comprising, adding to the drilling-fluid a small percentage of an alkali metal pyrophosphate.

17. A mud-laden drilling fluid containing a small percentage of sodium pyrophosphate.

TRUMAN B. WAYNE.